(12) United States Patent 
Cai et al.

(10) Patent No.: US 12,325,945 B2
(45) Date of Patent: Jun. 10, 2025

(54) ISOLATION TYPE TUNNEL WASHER FOR CLEANING CLOTHES AGAINST SECONDARY POLLUTION

(71) Applicant: Jiangsu Sea-lion Machinery Co., Ltd., Zhangjiagang (CN)

(72) Inventors: Shengang Cai, Zhangjiagang (CN); Weibing Lu, Zhangjiagang (CN); Lei Xia, Zhangjiagang (CN); Wenxian Tang, Zhangjiagang (CN); Zhiying Sun, Zhangjiagang (CN); Yun Chen, Zhangjiagang (CN); Jian Zhang, Zhangjiagang (CN); Sheng Guo, Zhangjiagang (CN); Xiuqing Cao, Zhangjiagang (CN)

(73) Assignee: Jiangsu Sea-Lion Machinery Co., Ltd., Zhangjiagang (CN)

( * ) Notice: Subject to any disclaimer, the term of this patent is extended or adjusted under 35 U.S.C. 154(b) by 371 days.

(21) Appl. No.: 18/147,037

(22) Filed: Dec. 28, 2022

(65) Prior Publication Data

US 2023/0399783 A1 Dec. 14, 2023

(30) Foreign Application Priority Data

Jun. 13, 2022 (CN) .......................... 202210659043

(51) Int. Cl.
*D06F 31/00* (2006.01)
*B01D 53/26* (2006.01)
*D06F 39/14* (2006.01)

(52) U.S. Cl.
CPC .......... *D06F 31/005* (2013.01); *B01D 53/26* (2013.01); *D06F 39/14* (2013.01)

(58) Field of Classification Search
CPC .......... D06F 31/00; D06F 39/14; D06F 95/00; D06F 35/001; D06F 39/00; D06F 33/32;
(Continued)

(56) References Cited

U.S. PATENT DOCUMENTS 4,509,345 A * 4/1985 Alio ........................ D06F 58/20
165/292
4,522,046 A * 6/1985 Dreher .................. D06F 31/005
68/27
(Continued)

FOREIGN PATENT DOCUMENTS

CN 109482043 A * 3/2019
CN 112076593 A * 12/2020
(Continued)

*Primary Examiner* — Michael E Barr
*Assistant Examiner* — Thomas Bucci
(74) *Attorney, Agent, or Firm* — Wang Law Firm, Inc.

(57) ABSTRACT

The present invention discloses an isolation type tunnel washer for cleaning clothes, which comprises a closed tunnel washer box body. A partition wall is provided in the middle of the tunnel washer box body, a feeding port and a discharging port are provided at two ends of the tunnel washer box body, and the feeding port and the discharging port are respectively located at two sides of the partition wall. A water vapor separation structure is mounted between the feeding port and the partition wall, the water vapor separation structure extracts and exhausts air from the interior of the tunnel washer box body, and a first door body and a second door body which can be opened and closed are respectively mounted at the feeding port and the discharging port.

10 Claims, 4 Drawing Sheets

(58) Field of Classification Search
CPC . D06F 2103/40; D06F 2105/44; B01D 53/26; Y02B 40/00
USPC .......................................................... 68/13 R
See application file for complete search history.

(56) References Cited

U.S. PATENT DOCUMENTS

| | | | | |
|---|---|---|---|---|
| 5,211,039 | A * | 5/1993 | Pellerin | D06F 31/005 68/58 |
| 5,392,480 | A * | 2/1995 | Ishihara | D06F 31/005 68/145 |
| 11,225,742 | B2 * | 1/2022 | Poy | D06F 31/005 |
| 2003/0110576 | A1 * | 6/2003 | ten Have | D06F 31/005 8/158 |
| 2003/0110815 | A1 * | 6/2003 | Poy | D06F 31/005 68/58 |
| 2006/0277690 | A1 * | 12/2006 | Pyo | D06F 35/00 8/158 |
| 2010/0146711 | A1 * | 6/2010 | Bringewatt | D06F 31/00 68/61 |
| 2010/0269267 | A1 * | 10/2010 | Poy | D06F 31/005 68/200 |
| 2011/0011136 | A1 * | 1/2011 | Wientjens | C09K 8/5086 237/57 |
| 2015/0252511 | A1 * | 9/2015 | Roberts | D06F 39/088 68/3 R |
| 2016/0097147 | A1 * | 4/2016 | Poy | D06F 35/005 8/137 |
| 2016/0113478 | A1 * | 4/2016 | Disch | A47L 15/481 134/95.2 |
| 2019/0255459 | A1 * | 8/2019 | Litt | B01D 53/265 |
| 2020/0208335 | A1 * | 7/2020 | Chudnovsky | D06F 58/48 |
| 2021/0372036 | A1 * | 12/2021 | Rensing | D06F 58/48 |
| 2022/0268518 | A1 * | 8/2022 | Chudnovsky | F26B 23/005 |

FOREIGN PATENT DOCUMENTS

| | | | | |
|---|---|---|---|---|
| CN | 212335573 U | * | 1/2021 | |
| CN | 214572818 U | * | 11/2021 | ............. D06F 31/00 |
| CN | 114270105 A | * | 4/2022 | ........ B01D 53/0462 |
| CN | 117547938 A | * | 2/2024 | ............. B01D 53/26 |
| CN | 118498017 A | * | 8/2024 | |
| DE | 102016105018 A1 | * | 9/2017 | ............. A61L 2/10 |
| KR | 20050118448 A | * | 12/2005 | |
| KR | 20060004362 A | * | 1/2006 | |
| KR | 102159546 B1 | * | 9/2020 | |
| WO | WO-2021182768 A2 | * | 9/2021 | ............. D06F 25/00 |

* cited by examiner

ISOLATION TYPE TUNNEL WASHER FOR CLEANING CLOTHES AGAINST SECONDARY POLLUTION

TECHNICAL FIELD

The present invention relates to a tunnel washer structure, in particular to an isolation type tunnel washer for cleaning clothes against secondary pollution.

BACKGROUND ART

The clothes used in some special fields such as medical fields often carry pathogenic bacteria. After such clothes are washed in a tunnel washer, if the air in the tunnel washer is directly discharged, some hazards might be caused. It is necessary to prevent the air from escaping when the laundry in the tunnel washer is taken out after the laundry, i.e. to prevent pathogenic bacteria from spreading out.

At present, the way to sterilize the tunnel washer is mainly to sterilize the wash water to sterilize the linen, but there is no way to effectively isolate the bacteria in the air of the tunnel washer in the washing process. For example, according to the technical solution disclosed in CN 201510657626.4, by determining the species and quantity of bacterial flora in the washing water, adding a certain dose of ozone to achieve the sterilization of the washing water. The method can reduce the pollution of air in the washing water to a certain extent, but cannot achieve the isolation of pathogenic bacteria in the washing water. Once the ozone leaks, the body of the operator will be seriously hurt. According to the teachings disclosed in CN 202120061953.4, the washed and pressed clothes are soaked in an antibacterial liquid in a dehydrator for a period of time and then are dehydrated to achieve the antibacterial status of the laundry, but the bacteria of the dirty linen during the washing process are not controlled at all and are easy to be spread into the air around the tunnel washer. According to the teachings disclosed in CN 202020924366.9, a sterilization particle box is provided at the top of the tunnel washer, and the sterilization particles in the sterilization box are controlled to enter the tunnel washer evenly in batches by means of an electric motor to achieve sterilization of the tunnel washer. However, the method also fails to solve the problem of leakage of pathogens during the operation of the tunnel washer and the isolation between the inlet and the outlet of the linen.

SUMMARY OF THE INVENTION

It is an object of the present invention to provide an isolation type tunnel washer for cleaning clothes against secondary pollution, so that the tunnel washer is capable of preventing the spread of bacteria from the tunnel washer to a greatest extent when the laundry is completed.

The embodiments of the present invention disclose an isolation type tunnel washer for cleaning clothes against secondary pollution. The tunnel washer includes a closed tunnel washer box body, a partition wall provided in the middle of the tunnel washer box body, a feeding port and a discharging port provided at two ends of the tunnel washer box body respectively, and the feeding port and the discharging port are located at two sides of the partition wall respectively. A water vapor separation structure is mounted between the feeding port and the partition wall, the water vapor separation structure extracts and exhausts air from the interior of the tunnel washer box body, and a first door body and a second door body which can be opened and closed are respectively mounted at the feeding port and the discharging port. The top of the second door body is rotatably mounted on the tunnel washer box body, a driving structure for driving the second door body to open and close is mounted on the outer side of the second door body, and an air blowing structure is provided on the inner side of the second door body. The air blowing structure blows air towards the interior of the tunnel washer box body to blow air inside, before the second door body is opened. The water vapor separation structure performs an air extraction operation in advance, and the second door body is opened while the air blowing structure performs an air blowing operation.

The water vapor separation structure comprises an extraction air cavity and an exhaust air cavity sealingly connected with each other. A fan for driving a flow of air is provided at the connection between the extraction air cavity and the exhaust air cavity, and the exhaust air cavity is provided horizontally. A first circular baffle is provided at an air extraction inlet of the extraction air cavity, and several first flow passages for the passage of air are provided between the outside of the first circular baffle and the inner wall of the extraction air cavity. A first trumpet-shaped baffle plate having a diameter gradually increasing along the air outlet direction is provided in the air extraction cavity at a side of the first flow passage away from the air extraction inlet. A second flow passage is provided on an axis center of the first trumpet-shaped baffle plate. an end of the air exhaust cavity facing away from the fan is provided with an air exhaust outlet, an annular groove projects outwards on the wall of the air exhaust cavity near the air exhaust outlet, and a return pipe is provided at the bottom of the annular groove.

In a preferred embodiment, the air extraction cavity is provided vertically, and the bottom of the air extraction cavity is provided with the air extraction inlet.

As a preferable solution, an end of the annular groove adjacent to the air exhaust outlet protrudes toward the inside of the annular groove, and is provided with a bucket-shaped baffle plate having a diameter gradually increasing in the direction of the exhaust air.

In a preferred embodiment, a second circular baffle is provided in the air extraction cavity on a side of the second flow passage away from the air extraction inlet, and several third flow passages for the passage of air are provided between the outside of the second circular baffle and the inner wall of the air extraction cavity.

In a preferred embodiment, a side of the third flow passage away from the air extraction inlet in the air extraction cavity is provided with a second trumpet-shaped baffle plate with a diameter gradually increasing along the air outlet direction, and the axis of the second trumpet-shaped baffle plate is provided with a fourth flow passage.

In a preferred embodiment, the diameter of the feeding section where the first circular baffle and the first trumpet-shaped baffle plate are provided on the air extraction cavity is smaller than the diameter of the middle section where the second circular baffle and the second trumpet-shaped baffle plate are provided on the air extraction cavity.

In a preferred embodiment, a side of the fourth flow passage away from the air extraction inlet is provided with an air permeable felt layer, and the air permeable felt layer is clamped by the upper and lower porous baffle plates.

In a preferred embodiment, the air blowing structure comprises first air blowing holes uniformly provided in a shape of cross on the inner side surface of the second door body, and an air delivery pipeline for delivering air to the first air blowing holes, wherein the air delivery pipeline is provided in a shape of cross on the outer side surface of the second door body.

In a preferred embodiment, the air blowing structure includes second air blowing holes uniformly distributed in the inner side of the second door body near the outer periphery.

In a preferred embodiment, the return pipe sealingly extends to the interior of the air extraction cavity and passes through the first circular baffle along the axis thereof, and the second circular baffle extends to the interior of the isolation type tunnel washer for cleaning clothes against secondary pollution.

The advantages of the present invention over the prior art are: the tunnel washer is partitioned by a partition wall, a feeding port and a discharging port are formed at two sides of the partition wall, the discharging port is prevented from carrying out pathogenic bacteria in the air to the greatest extent by adding a water vapor separation structure and an air blowing structure, when discharging, air is extracted by the water vapor separation structure before the second door body is opened, the air is extracted at the other side of the partition wall for special treatment, and the discharging port prevents air from escaping to the greatest extent for some reasons of intensity of pressure; at the same time, the discharging port is inwardly blown air by the blowing structure, so that the escape of bacteria-carrying air is further prevented.

Due to the horizontal arrangement of the air exhaust cavity, a condensate will generally form on the inner wall of the air exhaust cavity, and the condensate area is expanded through the annular groove, so that the water vapor can be condensed into a liquid, and then the arrangement of the bucket-shaped baffle plate enhances the impact surface of the air at the periphery of the air exhaust cavity; and due to the reverse arrangement of the bucket-shaped baffle plate, the condensed liquid cannot flow out of the air exhaust outlet and can only flow into the return pipe, preventing the liquid from hanging on the wall at the air exhaust outlet.

Since the air extraction inlet extends to the inside of the isolation type tunnel washer, the condensate can easily fall back to the inside of the tunnel washer, preventing the liquid from hanging on the wall at the air exhaust outlet.

Since the air extraction inlet is provided with a first circular baffle, and the outer side of the first circular baffle is provided with a first flow passage, and the first circular baffle impinges to hinder the air for the first time, the liquid in the air can be condensed back and fall down to reduce the moisture in the air, and the air can only pass through the first flow passage on the outer side, further reducing the moisture in the air, preventing the liquid from hanging on the wall at the air exhaust outlet to avoid the possibility of spread out of pollution.

Since the first trumpet-shaped baffle plate is provided above the first flow passage and has a diameter gradually increasing along the direction of outlet, and the first trumpet-shaped baffle plate is provided with a second flow passage at the axis, the air in the first flow passage will directly impinge on the first trumpet-shaped baffle plate, further condensing the water in the air and falling back, and the air can only pass through the second flow passage in the middle, further reducing the water in the air, preventing the liquid from hanging on the wall at the air exhaust outlet to avoid the possibility of spread out of pollution.

Since a second circular baffle is provided above the second flow passage, and a third flow passage is provided outside the second circular baffle, the air passing through the second flow passage directly impinges on the second circular baffle, further condensing the moisture in the air and falling back, and the air can only pass through the third flow passage on the outside, further reducing the moisture in the air, preventing the liquid from hanging on the wall at the air exhaust outlet to avoid the possibility of spread out of pollution.

Since a second trumpet-shaped baffle plate having a diameter gradually increasing along the air outlet direction is provided above the third flow passage, and the axis of the second trumpet-shaped baffle plate is provided with a fourth flow passage, the air in the third flow passage will directly impinge on the second trumpet-shaped baffle plate, further condensing the moisture in the air and falling back, and the air can only pass through the fourth flow passage in the middle, further reducing the moisture in the air, preventing the liquid from hanging on the wall at the air exhaust outlet to avoid the possibility of spread out of pollution.

Since an air permeable felt layer is provided above the fourth flow passage, and the air permeable felt layer is clamped by two porous baffle plates, the air in the fourth flow passage will absorb moisture to the greatest extent by the felt layer, and the moisture will also condense and fall back by striking the porous baffle plates, further reducing the moisture in the air, preventing the liquid from hanging on the wall at the air exhaust outlet to avoid the possibility of spread out of pollution.

DETAILED DESCRIPTION OF THE INVENTION

The technical solutions in the embodiments of the present invention will be described in detail below with reference to the drawings in the embodiments of the present invention, and it is obvious that the described embodiments are only a part of the embodiments of the present invention, and not all the embodiments. Based on the embodiments of the present invention, all other embodiments obtained by a person skilled in the art without inventive effort fall within the scope of the present invention.

Figure 1:
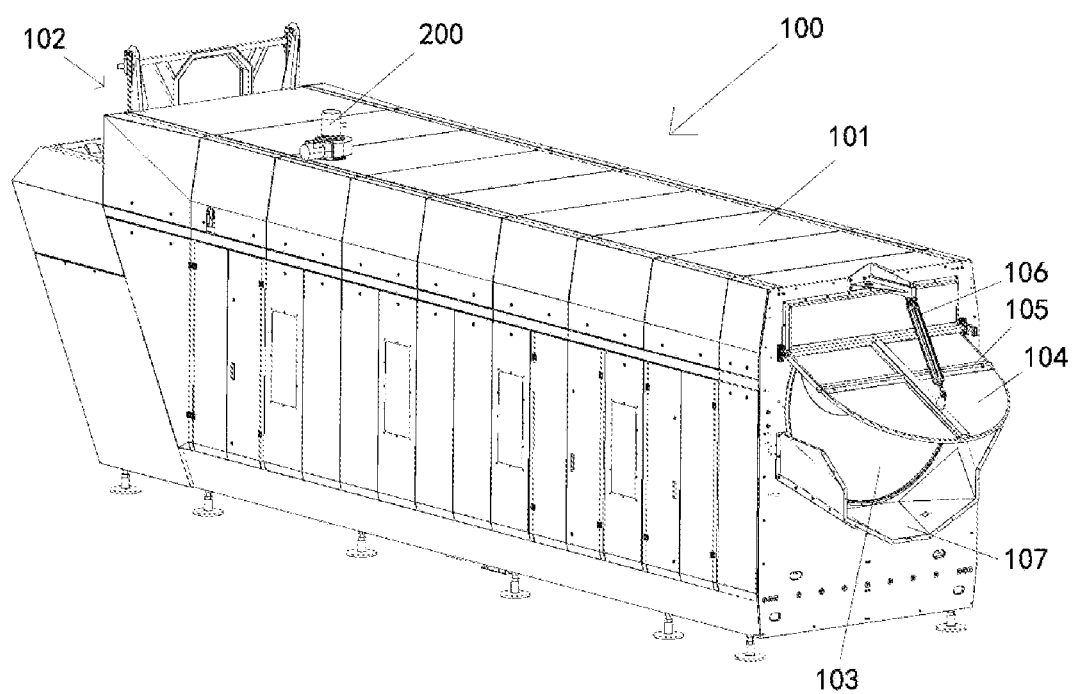
FIG. 1 is a perspective view showing an isolation type tunnel washer for cleaning clothes against secondary pollution according to an embodiment of the present invention.
Figure 2:
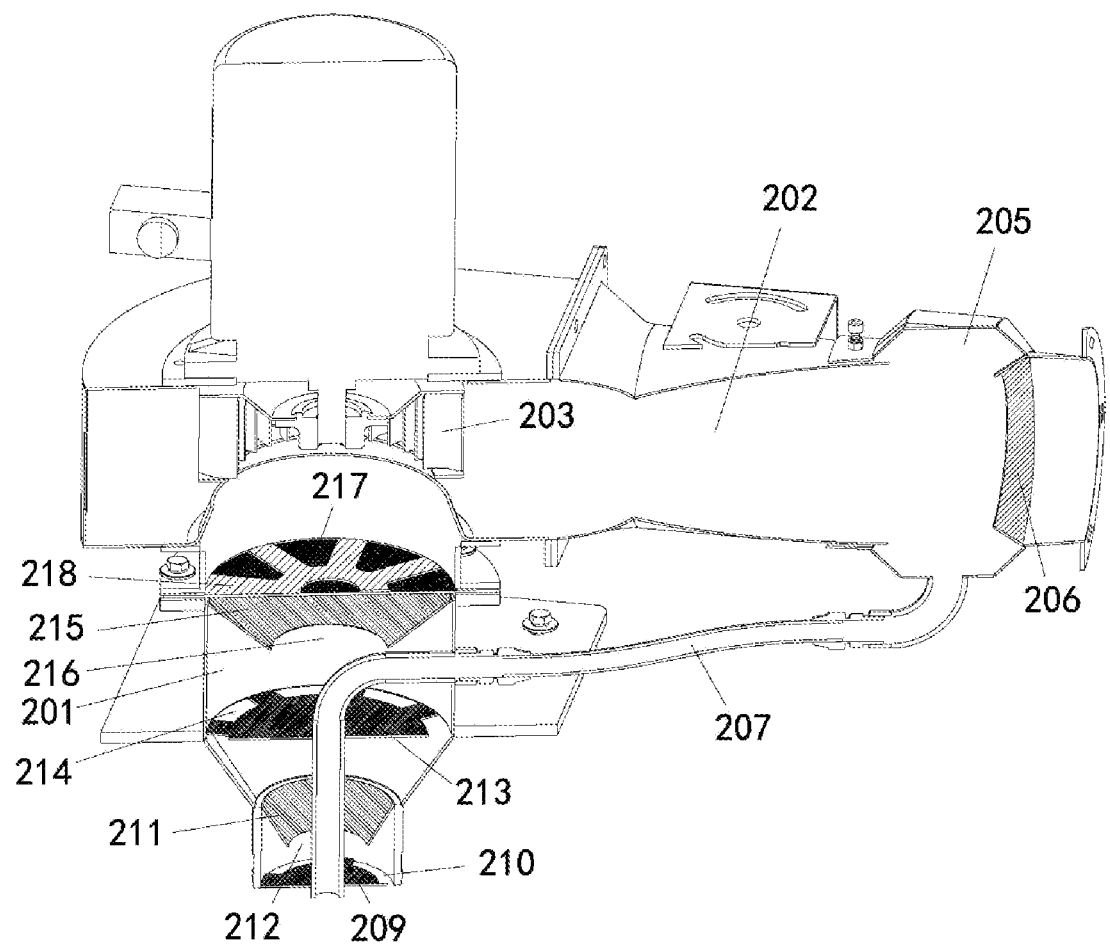
FIG. 2 is a half cross-sectional view showing a water vapor separation structure according to an embodiment of the present invention.
Figure 3:
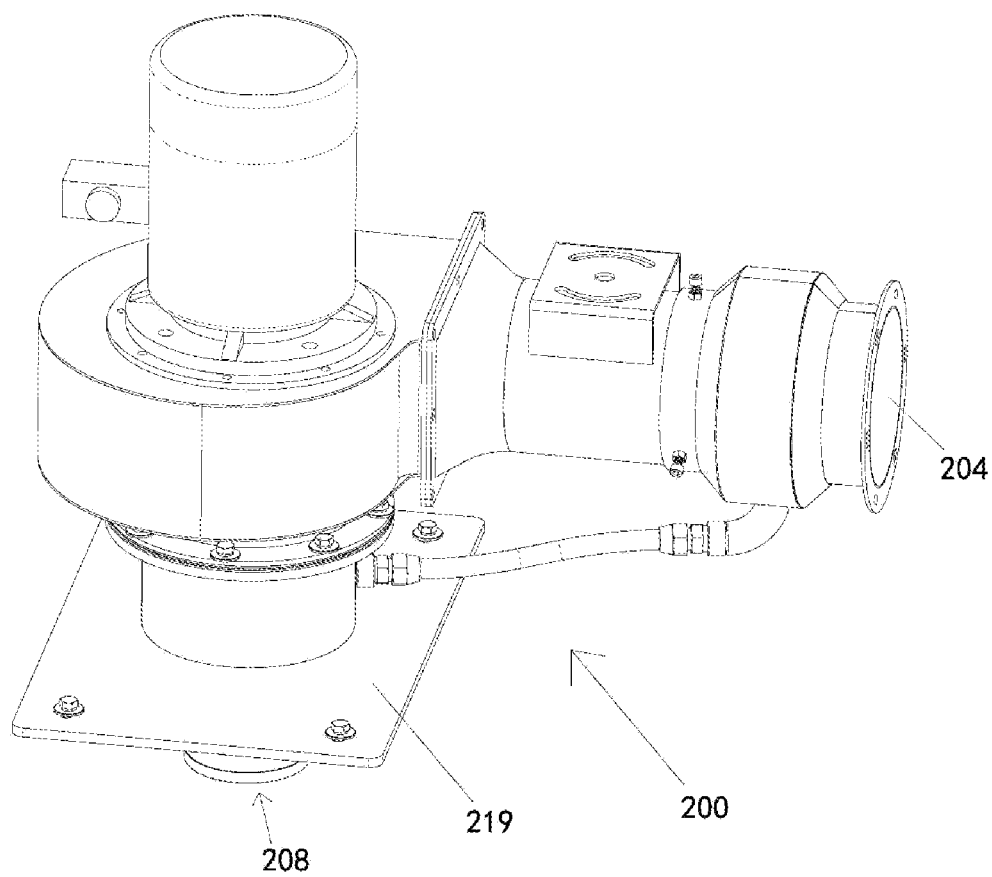
FIG. 3 is a perspective view showing a water vapor separation structure according to an embodiment of the present invention.

In conjunction with what is shown in FIGS. 1-3, an isolation type tunnel washer 100 for cleaning clothes against secondary pollution comprises a closed tunnel washer box body 101. The middle part of the tunnel washer box body 101 is mounted on a partition wall (not shown), two ends of the tunnel washer box body 101 are provided with a feeding port 102 and a discharging port 103 respectively, and the outer side of the discharging port 103 is provided with a blanking groove 107. The feeding port 102 and the discharging port 103 are located at two sides of the partition wall respectively. A water vapor separation structure 200 is mounted between the feeding port 102 and the partition wall on the tunnel washer box body 101; the water vapor separation structure 200 extracts and exhausts air from the interior of the tunnel washer box body 101. A first door body and a second door body 104 which can be opened and closed are respectively mounted at the feeding port 102 and the discharging port 103. The top of the second door body 104 is rotatably mounted on the tunnel washer box body 101. A driving structure for driving the opening and closing of the second door body 104 is mounted on the outer side of the second door body 104. The driving structure comprises a cylinder 106 having a fixed end rotatably mounted to the tunnel washer box body 101, and an output end of the cylinder 106 is rotatably mounted to an outer side surface of the second door body 104.

The inner side of the second door body 104 is provided with an air blowing structure, and the air blowing structure aims at the interior of the tunnel washer box body 101 to blow air inside. The air blowing structure includes first air blowing holes (not shown) uniformly provided in a shape of cross on the inner side surface of the second door body 104, and an air delivery pipeline 105 for delivering air to the first air blowing holes. The air delivery pipeline 105 is provided in a shape of cross on the outer side surface of the second door body 104.

A water vapor separation structure 200 for performing an air extraction operation on the isolation type tunnel washer 100 for cleaning clothes against secondary pollution, which comprises an air extraction cavity 201 and an air exhaust cavity 202 in sealed connection in sequence. A fan 203 for driving the flow of air is provided at the connection between the air extraction cavity 201 and the air exhaust cavity 202 which is horizontally provided. One end of the air exhaust cavity 202 facing away from the fan 203 is provided with an air exhaust outlet 204. An annular groove 205 projects outwards from the air exhaust cavity 202 near the air exhaust outlet 204, one end of the annular groove 205 near the air exhaust outlet 204 projects inside the annular groove 205 with a bucket-shaped baffle plate 206, and a return pipe 207 is provided at the bottom of the annular groove 205. The return pipe 207 sealingly extends to the inside of the air extraction cavity 201 and extends along the axis thereof to the inside of the isolation type tunnel washer 100 for cleaning clothes against secondary pollution. A mounting plate 219 is provided outside the air extraction cavity 201.

The air extraction cavity 201 is vertically provided, and the bottom of the air extraction cavity 201 is provided with an air extraction inlet 208. A first circular baffle 209 is provided at the air extraction inlet 208, and a first flow passage 210 is provided outside the first circular baffle 209. A first trumpet-shaped baffle plate 211 having a diameter gradually increasing along the outlet direction is provided above the first flow passage 210, and a second flow passage 212 is provided on the axis of the first trumpet-shaped baffle plate 211. A second circular baffle 213 is provided above the second flow passage 212, and a third flow passage 214 is provided outside the second circular baffle 213. A second trumpet-shaped baffle plate 215 having a diameter gradually increasing along the outlet direction is provided above the third flow passage 214, and the axis of the second trumpet-shaped baffle plate 215 is provided with a fourth flow passage 216. An air permeable felt layer 217 is provided above the fourth flow passage 216, and the air permeable felt layer 217 is clamped by two porous baffle plates 218. The water vapor separation structure 200 minimizes moisture in the air and minimizes wall hanging of liquid at the air exhaust outlet.

Before the second door body 104 is opened, the water vapor separation structure 200 performs a suction operation in advance, and when the second door body 104 is opened, the air blowing structure performs an air blowing operation at the same time, thereby preventing the spread out of bacteria in the tunnel washer to the greatest extent.

Figure 4:
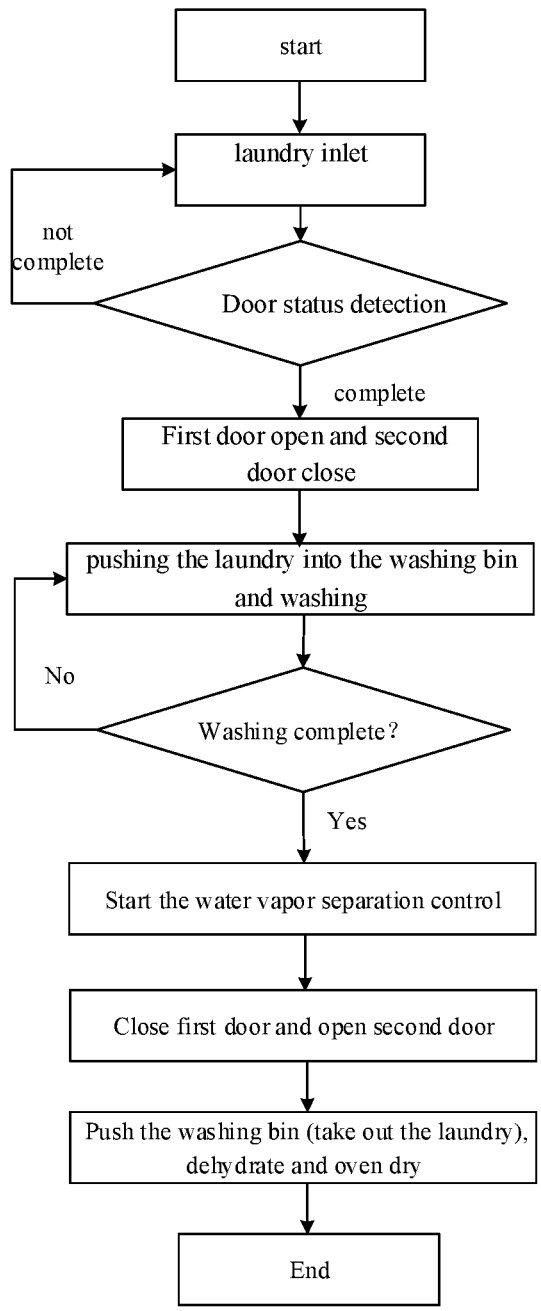
FIG. 4 is a flow chart showing the secondary pollution control of the tunnel washer according to the embodiment of the present invention.

As shown in FIG. 4, the method for controlling the isolation type tunnel washer for cleaning clothes against secondary pollution comprises the following steps:
step 1: starting the washing system;
step 2: feeding the laundry into a feeding port at one side of the partition wall;
step 3: detecting the open/close state of the isolation door body, and if the first door body is opened and the second door body is closed, pushing the washing bin, i.e., pushing the laundry into the washing bin;
step 4: washing the laundry, and sending an instruction of ending washing;
step 5: receiving the instruction by the water vapor separation system and starting the opening and closing operations of the isolation door body;
step 6: closing the first door body and opening the second door body, pushing the washing bin, i.e. pushing the washed laundry out through the laundry discharging port, dehydrating and oven drying same;
step 7: repeating steps 2-6; and
step 8: turning off the system at the end of all laundry washing.

While the foregoing is directed to embodiments of the present invention, it will be understood by a person skilled in the art that various changes may be made and equivalents may be substituted for elements thereof without departing from the spirit and scope of the invention.

What is claimed is:

1. An isolation type tunnel washer for cleaning clothes against secondary pollution, comprising:
a closed tunnel washer box body;
a partition wall provided in the middle of the tunnel washer box body;
a feeding port and a discharging port provided at two ends of the tunnel washer box body, respectively, the feeding port and the discharging port being located at two sides of the partition wall respectively,
wherein a water vapor separation structure is mounted between the feeding port and the partition wall, the water vapor separation structure extracts and exhausts air from an interior of the tunnel washer box body, and a first door body and a second door body which can be opened and closed are respectively mounted at the feeding port and the discharging port; a top of the second door body is rotatably mounted on the tunnel washer box body, a driving structure for driving the second door body to open and close is mounted on an outer side of the second door body, and an air blowing structure is provided on an inner side of the second door body, wherein the air blowing structure blows air toward the interior of the tunnel washer box body; before the second door body is opened, the water vapor separation structure performs an air extraction operation in advance, and the second door body is opened while the air blowing structure performs an air blowing operation;
wherein the water vapor separation structure comprises an air extraction cavity and an air exhaust cavity which are in sealed connection, a fan for driving a flow of air is provided at the connection between the air extraction cavity and the air exhaust cavity, the air exhaust cavity is provided horizontally, a first circular baffle is provided at an air extraction inlet of the air extraction cavity, and a first flow passage for the passage of air is provided between an outside of the first circular baffle and an inner wall of the air extraction cavity; a first trumpet-shaped baffle plate having a diameter gradually increasing along an air outlet direction is provided in the air extraction cavity at a side of the first flow passage away from the air extraction inlet, a second flow passage is provided on an axis center of the first trumpet-shaped baffle plate, an end of the air exhaust cavity facing away from the fan is provided with an air exhaust outlet, an annular groove projects outwards on a wall of the air exhaust cavity near the air exhaust outlet, and a return pipe is provided at the bottom of the annular groove.

2. The isolation type tunnel washer for cleaning clothes against secondary pollution according to claim 1, wherein the air extraction cavity is vertically provided, and the air extraction inlet is provided at the bottom of the air extraction cavity.

3. The isolation type tunnel washer for cleaning clothes against secondary pollution according to claim 1, wherein an end of the annular groove adjacent to the air exhaust outlet protrudes toward the inside of the annular groove, and is provided with a bucket-shaped baffle plate having a diameter gradually increasing in a direction of the exhaust air.

4. The isolation type tunnel washer for cleaning clothes against secondary pollution according to claim 1, wherein a second circular baffle is provided in the air extraction cavity on a side of the second flow passage away from the air extraction inlet, and a third flow passage for the passage of air are provided between an outside of the second circular baffle and the inner wall of the air extraction cavity.

5. The isolation type tunnel washer for cleaning clothes against secondary pollution according to claim 4, wherein a side of the third flow passage away from the air extraction inlet in the air extraction cavity is provided with a second trumpet-shaped baffle plate with a diameter gradually increasing along the air outlet direction, and an axis of the second trumpet-shaped baffle plate is provided with a fourth flow passage.

6. The isolation type tunnel washer for cleaning clothes against secondary pollution according to claim 5, wherein a diameter of the feeding section where the first circular baffle and the first trumpet-shaped baffle plate are provided on the air extraction cavity is smaller than a diameter of the middle section where the second circular baffle and the second trumpet-shaped baffle plate are provided on the air extraction cavity.

7. The isolation type tunnel washer for cleaning clothes against secondary pollution according to claim 5, wherein a side of the fourth flow passage away from the air extraction inlet is provided with an air permeable felt layer, and the air permeable felt layer is clamped by an upper porous baffle plate and an lower porous baffle plate.

8. The isolation type tunnel washer for cleaning clothes against secondary pollution according to claim 1, wherein the air blowing structure comprises first air blowing holes uniformly provided in a shape of cross on an inner side surface of the second door body, and an air delivery pipeline for delivering air to the first air blowing holes, wherein the air delivery pipeline is provided in a shape of cross on the outer side surface of the second door body.

9. The isolation type tunnel washer for cleaning clothes against secondary pollution according to claim 1, wherein the air blowing structure includes second air blowing holes uniformly distributed in the inner side of the second door body near an outer periphery.

10. The isolation type tunnel washer for cleaning clothes against secondary pollution according to claim 1, wherein the return pipe sealingly extends to an interior of the air extraction cavity and passes through the first circular baffle along the axis thereof, and a second circular baffle extends to the interior of the isolation type tunnel washer for cleaning clothes against secondary pollution.

* * * * *